(12) United States Patent
Tucker et al.

(10) Patent No.: US 11,249,682 B2
(45) Date of Patent: Feb. 15, 2022

(54) DATA MANAGEMENT SYSTEM AND METHOD

(71) Applicant: Pixit Media Limited, Leatherhead (GB)

(72) Inventors: Jeremy Tucker, Leatherhead (GB); Oleg Volkov, Leatherhead (GB)

(73) Assignee: Pixit Media Limited, Leatherhead (GB)

( * ) Notice: Subject to any disclaimer, the term of this patent is extended or adjusted under 35 U.S.C. 154(b) by 0 days.

(21) Appl. No.: 16/771,624

(22) PCT Filed: Nov. 30, 2018

(86) PCT No.: PCT/GB2018/053474
§ 371 (c)(1),
(2) Date: Jun. 10, 2020

(87) PCT Pub. No.: WO2019/116001
PCT Pub. Date: Jun. 20, 2019

(65) Prior Publication Data
US 2021/0181982 A1    Jun. 17, 2021

(30) Foreign Application Priority Data

Dec. 11, 2017 (GB) ...................................... 1720580

(51) Int. Cl.
*G06F 3/06* (2006.01)
*G06F 16/185* (2019.01)
*G06F 11/20* (2006.01)

(52) U.S. Cl.
CPC .......... *G06F 3/0659* (2013.01); *G06F 3/0617* (2013.01); *G06F 3/0619* (2013.01);
(Continued)

(58) Field of Classification Search
CPC ............................. G06F 3/0685; G06F 3/0659
See application file for complete search history.

(56) References Cited

U.S. PATENT DOCUMENTS

2017/0151155 A1    6/2017  Scheunemann et al.
2017/0161155 A1*   6/2017  Haustein ............. G06F 11/1451
(Continued)

OTHER PUBLICATIONS

International Search Report and Written Opinion dated Jan. 24, 2019, from application No. PCT/GB2018/053474.
(Continued)

*Primary Examiner* — Edward J Dudek, Jr.
(74) *Attorney, Agent, or Firm* — Foley & Lardner LLP

(57) ABSTRACT

A data management system coupled to a filesystem (16) and at least one data storage target (17), the system comprising: a processor configured to execute instructions; a memory storing instructions which, when executed by the processor, cause the processor to: receive a plurality of operation instructions from the filesystem (16); generate a plurality of light weight events, each light weight event corresponding to an operation instruction of the plurality of operation instructions; process each light weight event by enacting the operation instruction which corresponds to the light weight event to perform an operation on data stored by the at least one data storage target (17); and provide at least one response notification to the filesystem (16), the at least one response notification indicating a processing status for one or more of the light weight events such that the data management system can monitor each operation as it is performed on data stored by the at least one data storage target (17).

15 Claims, 7 Drawing Sheets

(52) U.S. Cl.
CPC .......... *G06F 3/0649* (2013.01); *G06F 3/0685* (2013.01); *G06F 11/203* (2013.01); *G06F 16/185* (2019.01)

(56) References Cited

U.S. PATENT DOCUMENTS

| | | | | |
|---|---|---|---|---|
| 2017/0286707 | A1* | 10/2017 | Eda | ................... G06F 16/1827 |
| 2019/0155534 | A1* | 5/2019 | Eda | ................... H04L 67/1097 |
| 2020/0081843 | A1* | 3/2020 | Gokhale | ............ G06F 11/1448 |

OTHER PUBLICATIONS

The Open Group, "Chapter 2—Interfaces", Systems Management: Data Storage Management (XDSM) API, Feb. 1, 1997, 27 pages.
European Office Action dated Dec. 20, 2021, from application No. 18815800.0.
Hovemeyer, David H., "Lecture 18: Fork/Join Parallelism," CS 365—Parallel and Distributed Computing, Oct. 13, 2014, 5 pages.

\* cited by examiner

DATA MANAGEMENT SYSTEM AND METHOD

This application is a national stage application under 35 U.S.C. § 371 of International Application No. PCT/GB2018/053474, filed Nov. 30, 2018, which claims priority from United Kingdom Application No. 1720580.8, filed Dec. 11, 2017, the entire contents of each of which are incorporated by reference herein.

The present invention relates to a data management system and method. The present invention more particularly relates to a data management system and method for use with a hierarchical storage management (HSM) system.

HSM is a data storage implementation which automatically moves data between high-cost and low-cost storage media. For instance, an HSM system is configured to automatically move data from a high-cost and high-speed storage device, such as a solid state drive to a slower and low-cost device, such as a hard disk drive.

The majority of HSM systems use the Data Management API (DMAPI) or XDSM open standard to tier or migrate data from a first data storage device (e.g. a high speed solid state drive) to a second non-local storage device (e.g. a hard disk drive). DMAPI is typically used to migrate data to or recall data from a storage device at a remote location, although DMAPI can also be used to migrate/recall data between storage devices at the same location. However, the system overhead to use DMAPI to migrate/recall data is usually higher than the overhead required by a local filesystem to migrate/recall the data. It is therefore impractical to use DMAPI in place of the filesystem to migrate/recall data between two local storage devices.

The performance of a computing system is impacted by the high system overhead of DMAPI. Furthermore, if there is a failure in the DMAPI system, the entire data storage system is taken offline because it is not possible to mount the filesystem without the DMAPI system being operational.

To try to combat the problem of a filesystem being taken offline due to the failure in a DMAPI system, multiple DMAPI systems will typically be provided in a data storage system in order to increase fault tolerance. FIG. 1 of the accompanying drawings shows a simplified topology of a conventional data storage system 1 which comprises a plurality of control servers 2-4 which are coupled for communication with a shared storage system 5 via a connectivity infrastructure 6. In this example, the control servers 2-4 are General Parallel File System (GPFS) or Spectrum Scale servers which are configured as a standard GPFS cluster.

The storage system 1 further comprises a primary DMAPI server 7 which is coupled for communication with the control servers 2-4 and the shared storage 5 via the connectivity infrastructure 6. The DMAPI server 7 provides DMAPI functionality within the system 1 to manage the transfer of data between the control servers 2-4 and the shared storage 5.

A failover DMAPI server 8 is also provided so that the failover DMAPI server 8 can continue to provide DMAPI functionality in the system 1 in the event that the primary DMAPI server 7 is taken offline.

While providing a failover DMAPI server increases fault tolerance in the system, there is an additional expense for a user to provide and maintain the failover DMAPI server.

A further problem with a conventional GPFS/Spectrum Scale data storage system that uses a conventional DMAPI configuration is that DMAPI events are generated and processed for a local filesystem only. It is therefore only possible to successfully recall a file on a local filesystem. FIG. 2 shows a conventional GPFS/Spectrum Scale system 9 which comprises multiple GPFS clusters. In this system 9, a first filesystem 10 is mounted to a first cluster 11 because the first filesystem 10 is local to the first cluster 11.

The first cluster 11 is configured to exchange data with a remote endpoint 12. However, due to the constraints of the DMAPI restrictions for GPFS/Spectrum Scale, only one endpoint 12 per filesystem is supported. The endpoint may be any type of endpoint including such as a tape based storage system or an object store.

The system 9 further comprises a second filesystem 13 which is configured to be mounted to a second cluster 14. However, in this conventional system where there are multiple GPFS clusters 11, 14, the DMAPI server can only manage a local filesystem for each cluster 11, 14 and not a remote mounted GPFS filesystem. This places a significant restriction on the operation of the data storage system 9 by restricting the transfer of data between clusters.

There is a need for a data management system and method which can alleviate at least some of the problems identified above.

The present invention seeks to provide an improved data management system and method.

According to one aspect of the present invention, there is provided a data management system coupled to a filesystem and at least one data storage target, the system comprising: a processor configured to execute instructions; a memory storing instructions which, when executed by the processor, cause the processor to: receive a plurality of operation instructions from the filesystem; generate a plurality of light weight events, each light weight event corresponding to an operation instruction of the plurality of operation instructions; process each light weight event by enacting the operation instruction which corresponds to the light weight event to perform an operation on data stored by the at least one data storage target; and provide at least one response notification to the filesystem, the at least one response notification indicating a processing status for one or more of the light weight events such that the data management system can monitor each operation as it is performed on data stored by the at least one data storage target.

Preferably, the data management system is a hierarchical storage management system.

Conveniently, at least one of the operation instructions is a Data Management API operation instruction.

Advantageously, the plurality of operation instructions are selected from a group including read, open for reading, write, open for writing, destroy/delete, close, eviction from memory or flushing a buffer.

Preferably, the system is configured to generate each light weight event in response to rule evaluated by a GPFS/Spectrum Scale Placement Policy.

Conveniently, the system further comprises: a user application module, and wherein the memory further stores instructions which, when executed by the processor, cause the processor to: detect the at least one processing status for one or more of the light weight events, wherein: if the at least one processing status indicates that processing of one or more of the light weight events is not complete, at least partly suspending an input and output of the user application module, and if the at least one processing status indicates that processing of one or more of the light weight events is complete, enabling the input and output of the user application module.

Advantageously, the memory further stores instructions which, when executed by the processor, cause the processor to: store the light weight events for processing in a queue of light weight events.

Preferably, the memory further stores instructions which, when executed by the processor, cause the processor to: generate a first tracking record of light weight events that are queued for processing in the queue of light weight events; and generate a second tracking record of light weight events that have been processed.

Conveniently, the memory further stores instructions which, when executed by the processor, cause the processor to: generate first and second tracking records for each data storage target in the storage management system.

Advantageously, each tracking record is a hash table.

Preferably, the memory further stores instructions which, when executed by the processor, cause the processor to: compare the number of light weight events in the queue of light weight events with a threshold number and, if the number of light weight events is greater than the threshold number, processing a portion of the light weight events in one or more child subprocesses.

Conveniently, the memory further stores instructions which, when executed by the processor, cause the processor to: process the or each child subprocess in parallel with processing another portion of the light weight events.

According to another aspect of the present invention, there is provided a method of managing data in a storage management system, wherein the storage management system comprises a filesystem and at least one data storage target, the method comprising: receiving a plurality of operation instructions from the filesystem; generating a plurality of light weight events, each light weight event corresponding to an operation instruction of the plurality of operation instructions; processing each light weight event by enacting the operation instruction which corresponds to the light weight event to perform an operation on data stored by the at least one data storage target; and providing at least one response notification to the filesystem, the at least one response notification indicating a processing status for one or more of the light weight events such that the storage management system can monitor each operation as it is performed on data stored by the at least one data storage target.

Preferably, the storage management system is a hierarchical storage management system.

Conveniently, at least one of the operation instructions is a Data Management API operation instruction.

Advantageously, the plurality of operation instructions are selected from a group including read, open for reading, write, open for writing, destroy/delete, close, eviction from memory or flushing a buffer.

Preferably, the method comprises generating each light weight event in response to rule evaluated by a GPFS/Spectrum Scale Placement Policy.

Conveniently, the plurality of operation instructions are provided to the filesystem by a user application, and wherein the method further comprises: detecting the at least one processing status for one or more of the light weight events, wherein: if the at least one processing status indicates that processing of one or more of the light weight events is not complete, at least partly suspending an input and output of the user application, and if the at least one processing status indicates that processing of one or more of the light weight events is complete, enabling the input and output of the user application.

Advantageously, the method further comprises: storing the light weight events for processing in a queue of light weight events.

Preferably, the method further comprises: generating a first tracking record of light weight events that are queued for processing in the queue of light weight events; and generating a second tracking record of light weight events that have been processed.

Conveniently, the method comprises generating first and second tracking record for each data storage target in the storage management system.

Advantageously, each tracking record is a hash table.

Preferably, the method further comprises: comparing the number of light weight events in the queue of light weight events with a threshold number and, if the number of light weight events is greater than the threshold number, processing a portion of the light weight events in one or more child subprocesses.

Conveniently, the or each child subprocess is performed in parallel with processing another portion of the light weight events.

Advantageously, the or each child subprocess is a multi-threaded process.

According to a further aspect of the present invention, there is provided a computer readable medium storing instructions which, when executed by a computing device or system, cause the computing device or system to perform the method of any one of claims 13 to 25 as defined hereinafter.

According to another aspect of the present invention, there is provided a computer program product comprising instructions which, when executed by a computing device or system, cause the computing device or system to perform the method of any one of claims 13 to 25 as defined hereinafter.

So that the present invention may be more readily understood, embodiments of the present invention will now be described, by way of example, with reference to the accompanying drawings, in which.

Figure 5:
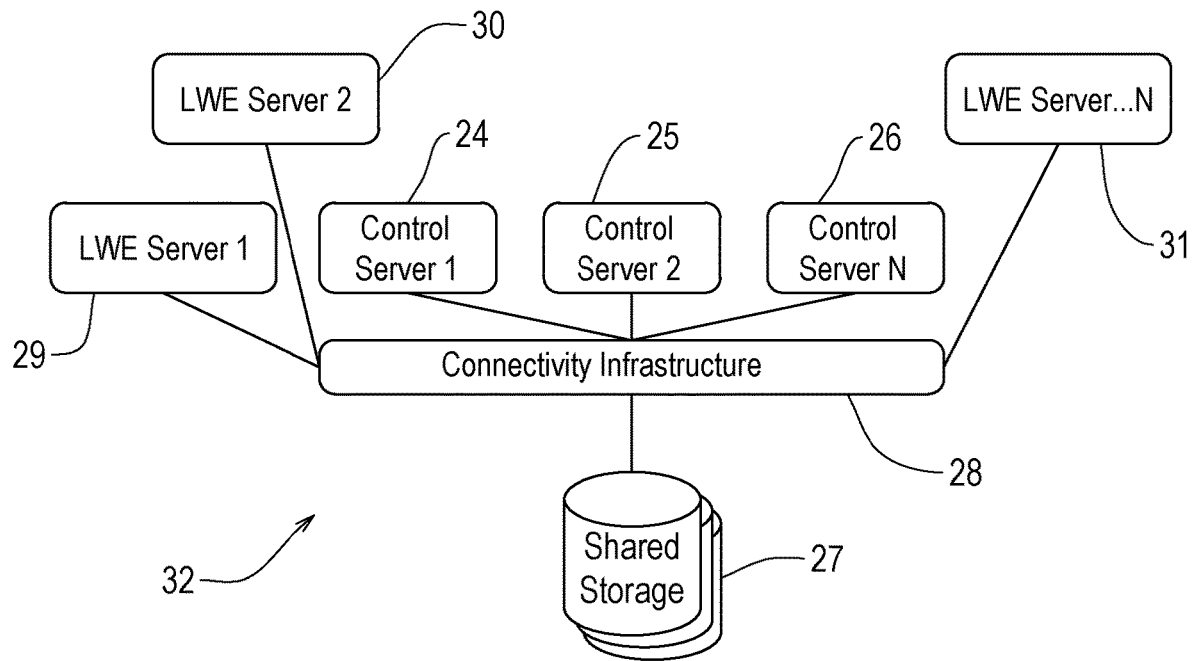
Figure 6:
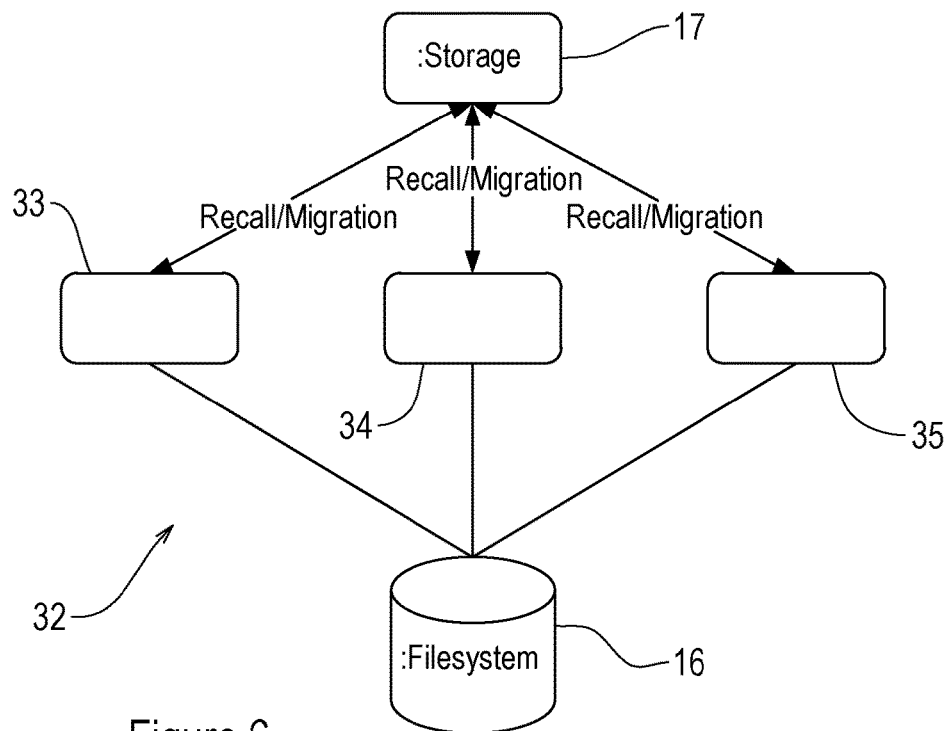
Figure 7:
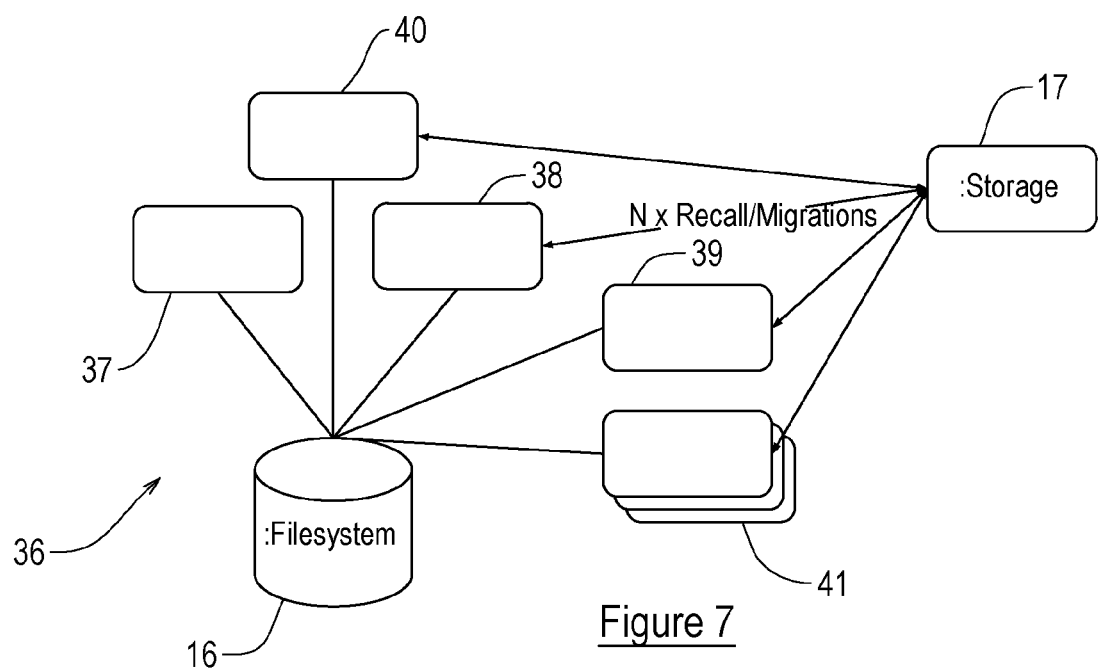
Figure 8:
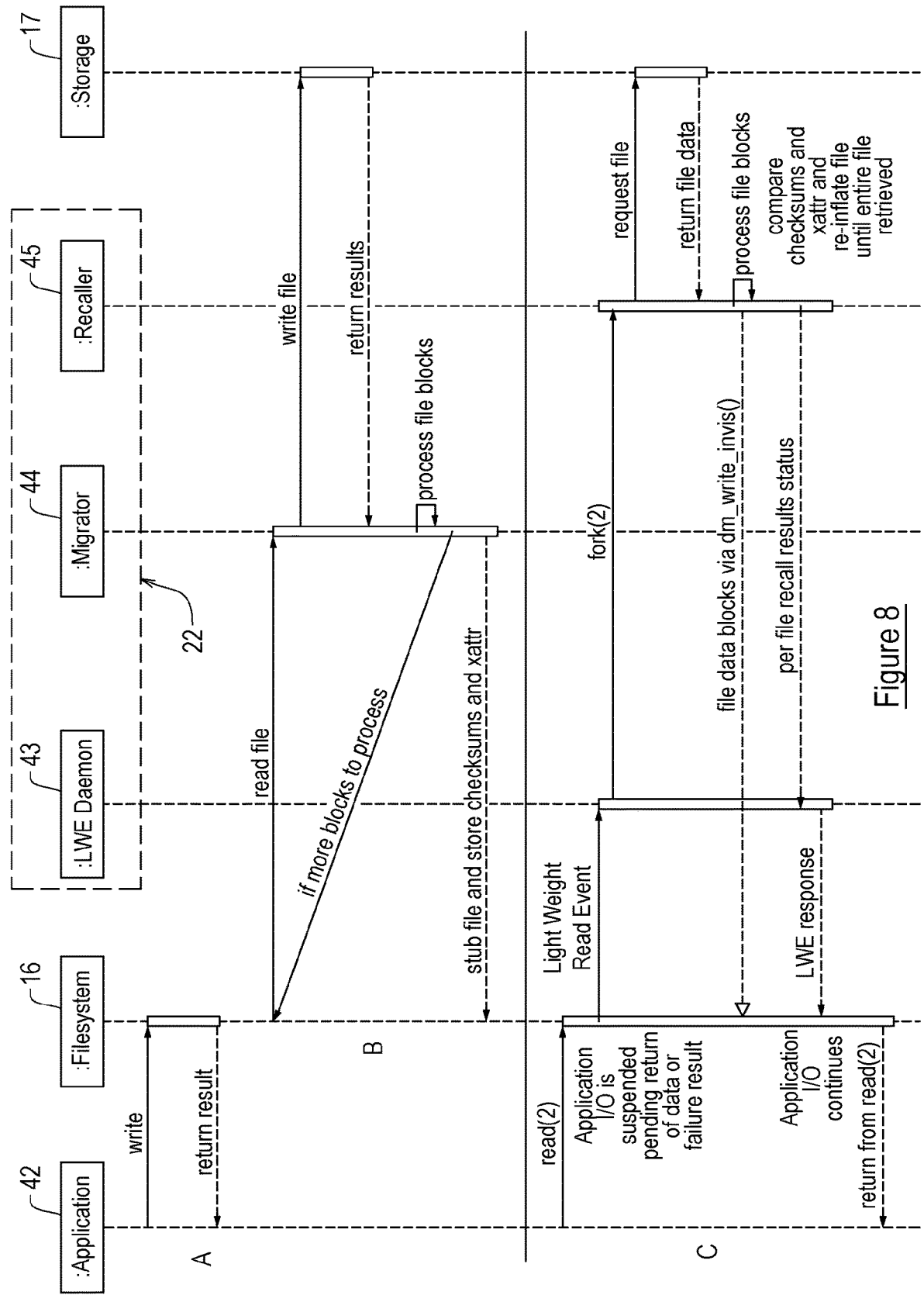
Figure 9:
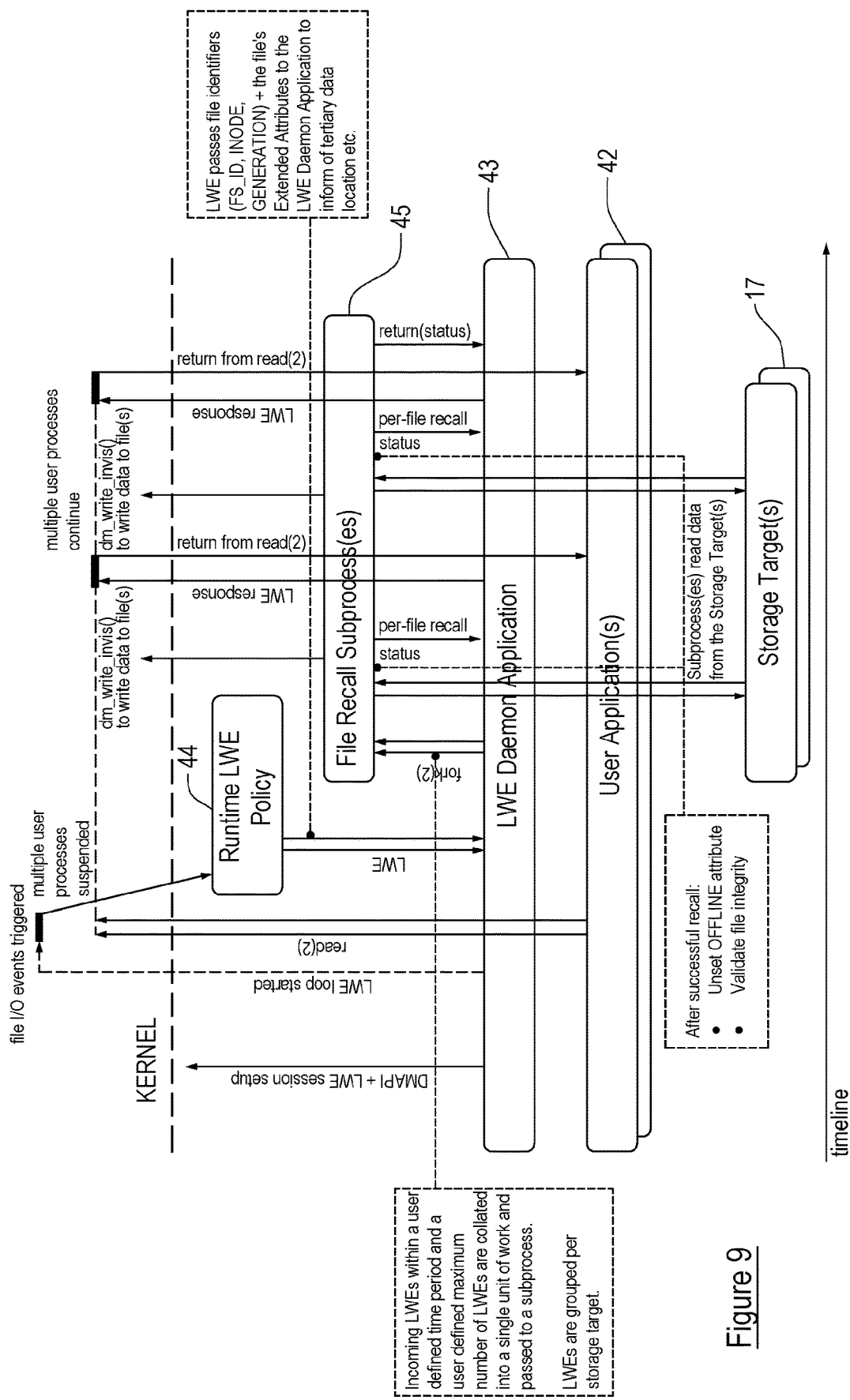
Figure 10:
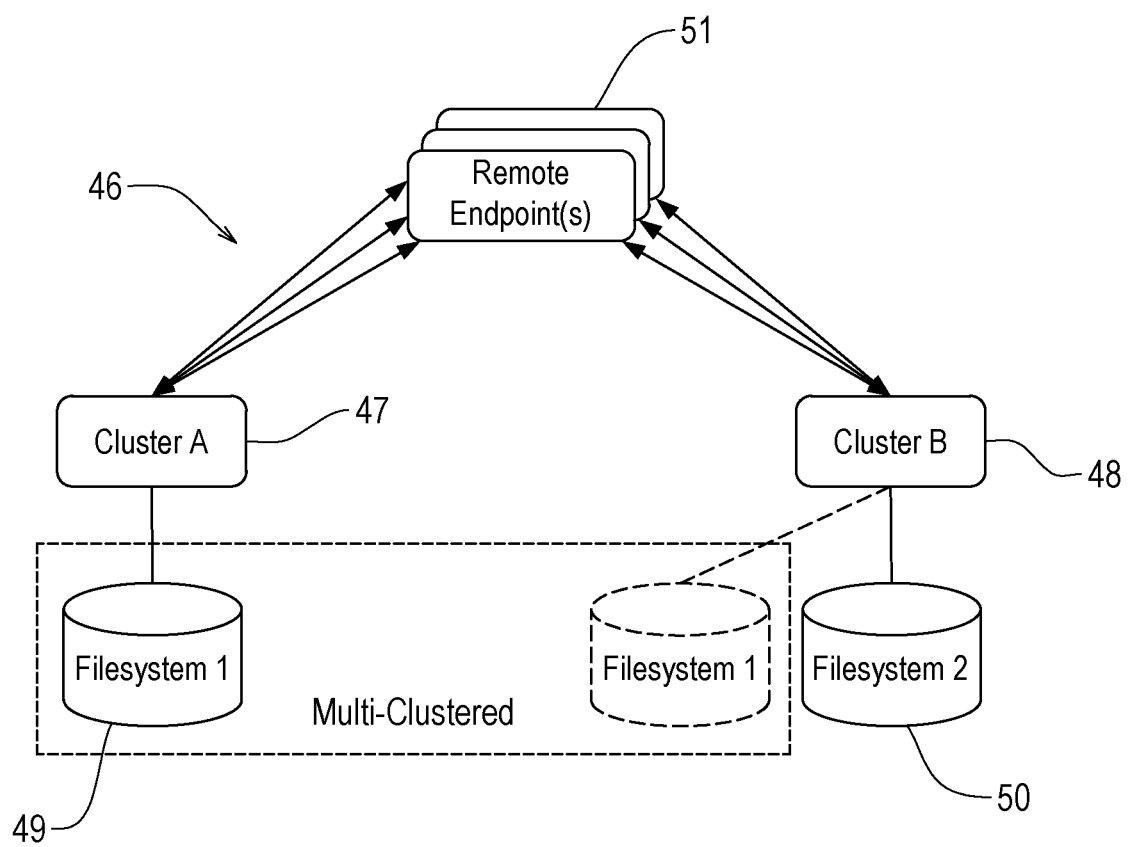

FIG. 5 is a schematic diagram of a data storage system of yet further embodiments, FIG. 6 is a schematic diagram of a data storage system of some embodiments, FIG. 7 is a schematic diagram of a data storage system of some embodiments, FIG. 8 is a sequence diagram illustrating steps in a data management method of some embodiments, FIG. 9 is a sequence diagram showing steps of a data management method of further embodiments, and FIG. 10 is a schematic diagram of a data storage system of some embodiments.

Figure 3:
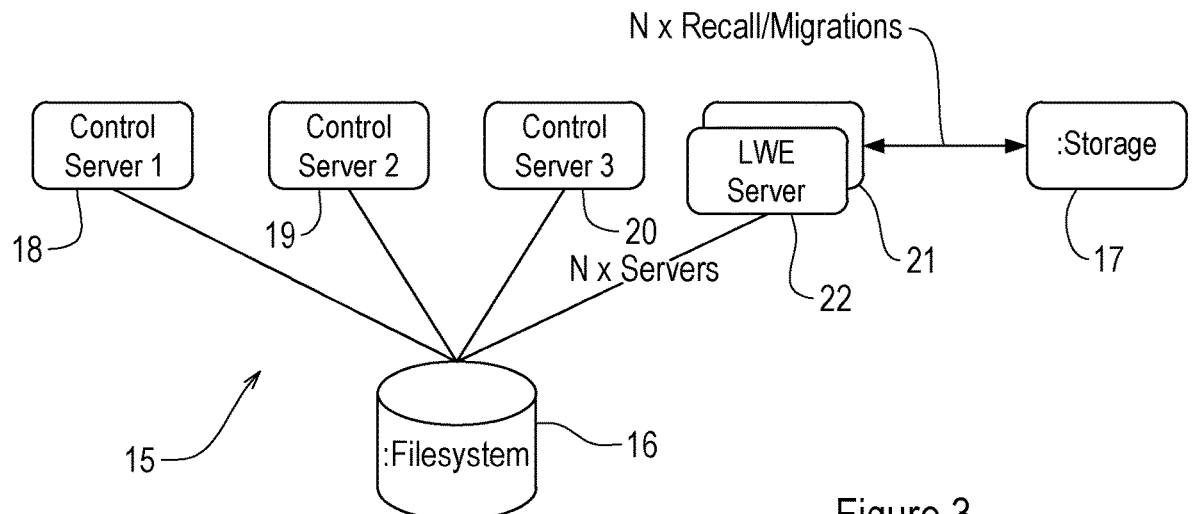
FIG. 3 is schematic diagram of a data storage system of some embodiments.

Referring now to FIG. 3 of the accompanying drawings, a data management system 15 of some embodiments comprises a filesystem 16 and a data storage target 17. In some embodiments, the data management system 15 is a hierarchical storage management system (HSM).

The filesystem 16, which is also referred to below as a filesystem module, is implemented in technical computing hardware, such as a server.

The data storage target 17 comprises one or more data storage arrangements. The data storage target comprises any type of data storage media which may be distributed between a plurality of data storage devices or servers. In some embodiments, at least one of the data storage arrangements is a hard disk which functions as a low-cost data storage target within a HSM system.

The data storage system 15 of this embodiment further comprises a plurality of control servers 18-21 which are configured to control the migration or recall of data between the data storage target 17 and a further data storage target in response to operations from the filesystem 16. In some embodiments, the control servers 18-21 comprise one or more Quorum servers.

In a conventional data storage system, one of the control servers 18-21 would be configured to process DMAPI operations provided by the filesystem 16 to cause the data storage target 17 to perform operations on data stored by the data storage target 17. However, in some embodiments, the DMAPI system is replaced partially or completely with a LWE server 22 which is configured to function using light weight events (LWE) instead of DMAPI operations. In this embodiment, the LWE server 22 is implemented in the fourth control server 21. However, it is to be appreciated that the LWE server 22 may be implemented in one of the other control servers 18-20 or in separate technical computing hardware.

The technical functionality of LWE is described in detail below, along with the significant performance benefits over a conventional data storage system that uses DMAPI.

Figure 4:
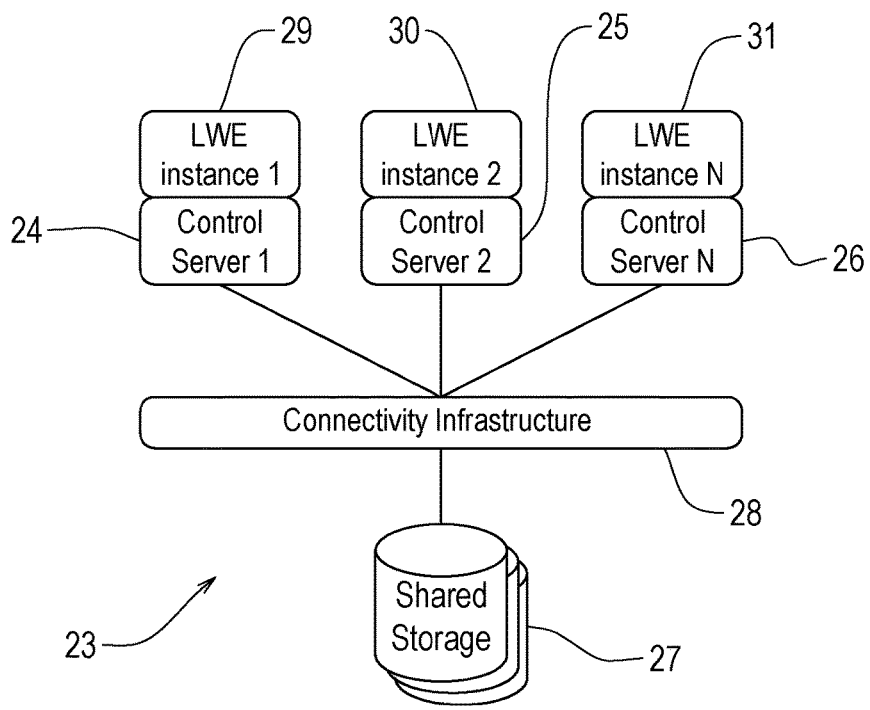
FIG. 4 is a schematic diagram of a data storage system of further embodiments.

Referring now to FIG. 4 of the accompanying drawings, a data storage system 23 of some embodiments comprises a plurality of control servers 24-26 which are coupled for communication with a shared storage 27 via a connectivity infrastructure 28. However, in this embodiment, the LWE server is replicated in a plurality of instances of the LWE server 29-31 which are each implemented in one of the control servers 24-26.

Referring now to FIG. 5 of the accompanying drawings, a data storage system 32 of some embodiments comprise many of the same components as the embodiments shown in FIG. 4. However, in this embodiment the LWE server instances are implemented in dedicated computing hardware which is separate from the control servers 24-26.

It is also to be appreciated that the system of some embodiments comprises a greater or fewer number of control servers than the embodiments described above.

Referring now to FIG. 6 of the accompanying drawings, a data storage system 32 of further embodiments comprises an equivalent filesystem 16 and an equivalent data storage target 17 to the embodiment described above. However, in this embodiment, there are three control servers 33-35 which are each coupled for communication with the data storage target 17 to recall/migrate data from the data storage target 17. Each of the control servers 33-35 is coupled for communication with the filesystem 16. In this embodiment, each of the control servers 33-35 incorporates an implementation of a LWE server which is equivalent to the LWE server 22 described above. It is to be appreciated that, in further embodiments, there may be a greater or fewer number of control servers than the three control servers 33-35 shown in FIG. 6.

Referring now to FIG. 7 of the accompanying drawings, a data storage system 36 of yet further embodiments comprises a filesystem 16 and a data storage target 17 which are equivalent to the filesystem 16 and the data storage target 17 of the embodiments described above. However, in this embodiment, the data storage system 36 comprises three control servers 37-39, with the LWE server only implemented in two of the control servers 38-39 and not on the third control server 37. In this embodiment, the system 36 further comprises an additional server 40 which is not a control server of the type described above, but the additional server 40 comprises an implementation of the LWE server which is equivalent to the LWE server 22 described above. In this embodiment, the system 36 further comprises one or more client nodes 41 with LWE functionality implemented on one or more of the client nodes 41.

The embodiments shown in FIGS. 3-7 are examples of some configurations of a data management system incorporating components of embodiments of the invention. However, it will be appreciated by a person skilled in the art that embodiments of the invention may be implemented in other configurations of a data management system within the scope of the claims hereinafter.

The operation of a data storage system of some embodiments and a method of managing data in a data storage system will now be described with reference to FIG. 8. The operation will be described with reference to the data storage system 15 described above but it is to be appreciated that the operation applies equally to the other embodiments described above.

The sequence diagram shown in FIG. 8 is divided into three stages A, B and C. Each of these stages A-B will be described below.

FIG. 8 shows the sequence of events that occur within the data storage system 15 and the interaction between an application 42, the filesystem 16, the LWE server 22 and the data storage target 17. The LWE server 22 comprises at least three technical modules; a light weight event (LWE) module 43, a migrator module 44 and a recaller module 45.

In this embodiment, the LWE module 43 is in the form of a LWE daemon which executes on the LWE server 22. The migrator module 44 and the recaller module 45 are technical modules which execute on the LWE server 22

Operation Stage A

Stage A in FIG. 8 represents the operation of the data storage system 15 to write data to the filesystem 16. The application 42 passes a write request to the filesystem 16 to write data to the filesystem 16. The filesystem 16 then returns a result to the application 42 once the data has been written. During stage A, the data that is written to the filesystem 16 is not necessarily managed by the LWE server 22. As illustrated in FIG. 8, the write request is not passed to the LWE server 22 and there is no requirement for the LWE module 43 to respond to the write request.

Operation Stage B

A data migration is enacted in stage B. The migrator module 44 reads data from a file which is designated by the filesystem 16 for migration. The migrator module 44 is configured to combine data migration requests and to send data blocks to the data storage target via a single or multi-threaded communication interface. In some embodiments, the migrator module 44 is configured to calculate checksums for data blocks of the migrated data to calculate overall file check sums and to store attributes (xattr) in migrated data files and/or local stub files.

In some embodiments, the migrator module 44 is further configured to stub successfully migrated data files. The process of stubbing makes the file which is to be processed smaller than the original file and also appends or modifies the file to comprise an identifier which contains a reference to the migrated complete file in the data storage target 17. In some embodiments, files are stubbed from their original size to zero bytes. In other embodiments, the stubbing process maintains a portion of the original file on the filesystem. The portion of the original file could be any portion of the original file or several non-sequential portions of the original file with a reference to the remainder of the file stored in the data storage target 17. Stubbed files are at least partly restored by a restore function which is performed by the data storage system 15.

As with stage A, stage B does not necessarily require the LWE module 43 to respond to the event.

Operation Stage C

The LWE server 22 is configured to intercept requests, such as operating instructions, from the application 42 to the filesystem 16. The LWE server 22 is therefore configured to receive a plurality of operation instructions from the filesystem 16. In the example shown in FIG. 8, the LWE module 43 intercepts a request, such as a read (2) request, from the application 42.

In some embodiments, the LWE module 43 is configured to intercept one or more predetermined operations or requests selected from a group including, but not limited to, read, open for reading, write open for writing, destroy/delete, close, eviction from memory or flushing a memory buffer. The interception of operations or requests by the LWE module 43 does not produce any measureable performance decrease in the associated filesystem. In some embodiments, the LWE module 43 is configured to intercept requests where at least one of the operation instructions of the requests is a Data Management API (DMAPI) operation instruction.

When the LWE module 43 intercepts a request, such as the read (2) request shown in FIG. 8, the filesystem 16 at least partly or completely suspends the input and output (I/O) of the application 429 until the filesystem 16 returns a processing status to the application 42 indicating that the processing of the corresponding LWE is complete or a failure result to the application 42. The I/O of the application 42 is therefore at least partly or completely suspended pending the result of the processing of the LWE corresponding to the intercepted request.

The LWE module 43 is configured to generate a further event which is referred to here as a light weight event (LWE) which corresponds to each operation instruction of the intercepted requests. In some embodiments, the further event which is generated by the LWE module 43 is known as a light weight event because the generation and processing of the event uses minimal memory and processing resources. Consequently, in some embodiments, the generation and processing of the LWE does not produce any measureable performance decrease in the associated filesystem.

In the example shown in FIG. 8, the LWE is a light weight read event which corresponds to the read operation generated by the filesystem 16.

In some embodiments, the LWE server 22 is configured to generate each light weight event in response to rule evaluated by a GPFS/Spectrum Scale Placement Policy.

The LWE module 43 is configured to continually poll the system 15 and/or to listen for generated LWE, such as the light weight read event described above. In some embodiments, the LWE module 43 is configured to store each LWE for processing in a queue of light weight events.

In some embodiments, the LWE module 43 is configured to generate a first tracking record of light weight events that are queued for processing in the queue of light weight events and generate a second tracking record of light weight events that have been processed.

In some embodiments, the LWE module 43 is configured to generate first and second tracking records for each data storage target in the storage management system.

In some embodiments, each tracking record is a hash table.

In some embodiments, the LWE module 43 is configured to compare the number of light weight events in the queue of light weight events with a threshold number and, if the number of light weight events is greater than the threshold number, processing a portion of the light weight events in one or more child subprocesses.

In some embodiments, the LWE module 43 is configured to process the or each child subprocess in parallel with processing another portion of the light weight events.

The LWE server 22 is configured to process each light weight event by enacting the operation instruction which corresponds to the light weight event to perform an operation on data stored by the at least one data storage target 17.

In some embodiments, the LWE server 22 is configured to fork (2) the processing of the light weight events when the number of light weight events exceeds a predetermined value. The LWE server 22 forks the processing of the light weight events into one or more child sub-processes to handle the requests. These child sub-processes may themselves be sub-processed in a plurality of multi-threaded processing operations. The fork functionality of the management server 8 enables the light weight events to be processed in parallel with one another to increase the speed and efficiency of the operation of the data storage system. The fork functionality provides true scale out file recall processes. Additionally, each forked sub-process can perform parallel recall of files on a per-block basis.

The implementation of the LWE server 22 of some embodiments is such that performance file operations are only limited by the resources of the underlying hardware upon which the LWE server 22 is implemented (i.e. the processor, memory, network speed, etc.).

In a technical evaluation of a data storage system of some embodiments, the LWE server 22 has been proven to fully utilise a 10 Gb data connection to an endpoint. Further tests have shown that additional network interfaces or LWE servers can be provided in a data management system of some embodiments to scale the performance of the system linearly until the hardware resources of a node in the system is fully utilised or in order to fully utilise the performance of the available external network infrastructure.

The recaller module 45 is configured to traverse the queue of unprocessed light weight events and to request data from the data storage target 17. The data storage target 17 returns the data to the recaller module 45. In some embodiments, the recaller module 45 processes the returned data in file blocks and compares checksums computed from the returned data with stored checksums. If necessary, the recaller module 45 at least partly re-inflates stubbed files to restore data in the file. The recaller module 45 then returns the data to the filesystem 16.

In some embodiments, the recaller module 45 returns a response notification or result status to the LWE module 43 as each file is processed. In this embodiment, the recaller module 45 does not wait until all files are processed before providing the response notification to the LWE module 43. Each response notification indicates a processing status for one or more of the light weight events such that the data management system can monitor each operation as it is performed on data stored by the at least one data storage target. This enables the LWE module 43 to react quickly to each response notification as soon as it is output from the recaller module 45.

In some embodiments, the LWE module 43 is configured to detect the at least one processing status for one or more of the light weight events. If the at least one processing status indicates that processing of one or more of the light weight events is not complete, the system is configured to at least partly suspending an input and output of the user application module 42. If, on the other hand, the at least one processing status indicates that processing of one or more of the light weight events is complete, the system is configured to enable the input and output of the user application module 42.

FIG. 9 of the accompanying drawings shows a timeline of operation within the data management system 15 of the embodiments described above. The same reference numbers are used for corresponding components of the system to the components of the system described above. It can be seen from FIG. 9 that the system 15 of some embodiments is configured to store unprocessed light weight events within a predetermined time period and to collate a predetermined maximum number of light weight events into a single unit of work which is passed to a sub-process by forking the operation into one or more sub-processes, as discussed above.

In some embodiments, the light weight events are grouped by the recaller module 45 so that different groups of light weight events are associated with different storage targets within the storage target 18. In some embodiments, the light weight events are grouped into a plurality of groups which are each associated with a storage target so that the light weight events in each group can be processed to perform operations on the associated storage target. This optimises the operation of the system by distributing the processing of the light weight events between the storage targets so that the operations can be carried out in parallel with one another on the storage targets.

A further benefit of the data storage system of some embodiments is that the LWE server 22 permits an effectively unlimited number of endpoints for one or more filesystems in a cluster. FIG. 10 shows a data management system 46 of some embodiments which comprises first and second clusters 47, 48 which each respectively mount a first filesystem 49 and a second filesystem 50. The configuration of the LWE server 22 is such that the system 46 supports many endpoints 51 for each of the filesystem 49, 50.

Figure 1:
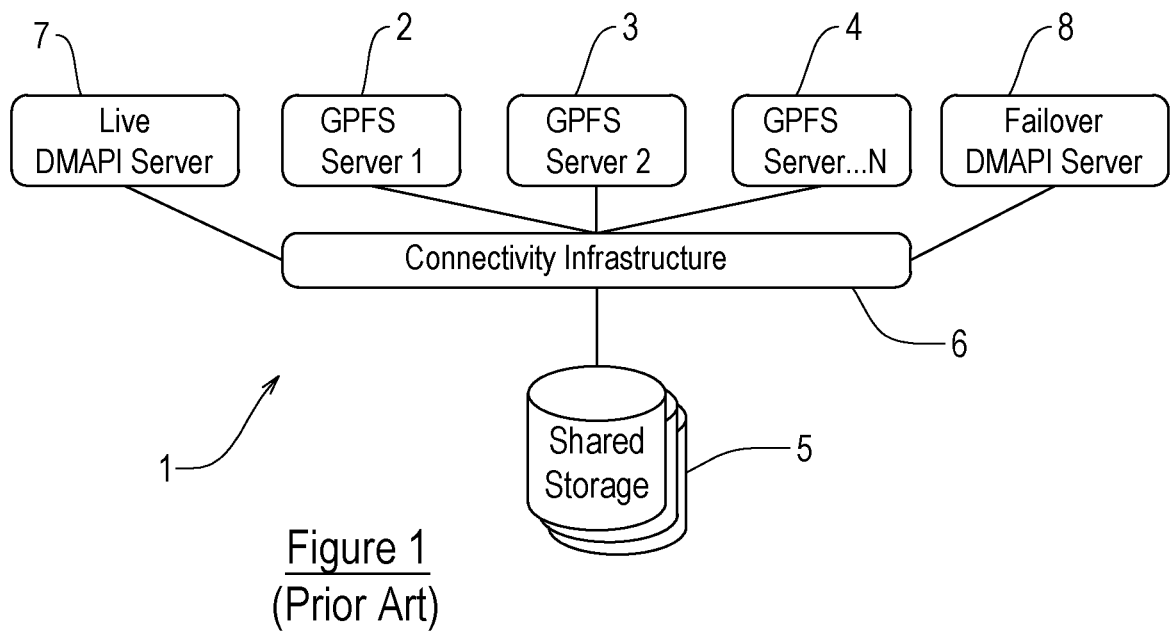
FIG. 1 is a schematic diagram of a conventional data storage system.
Figure 2:
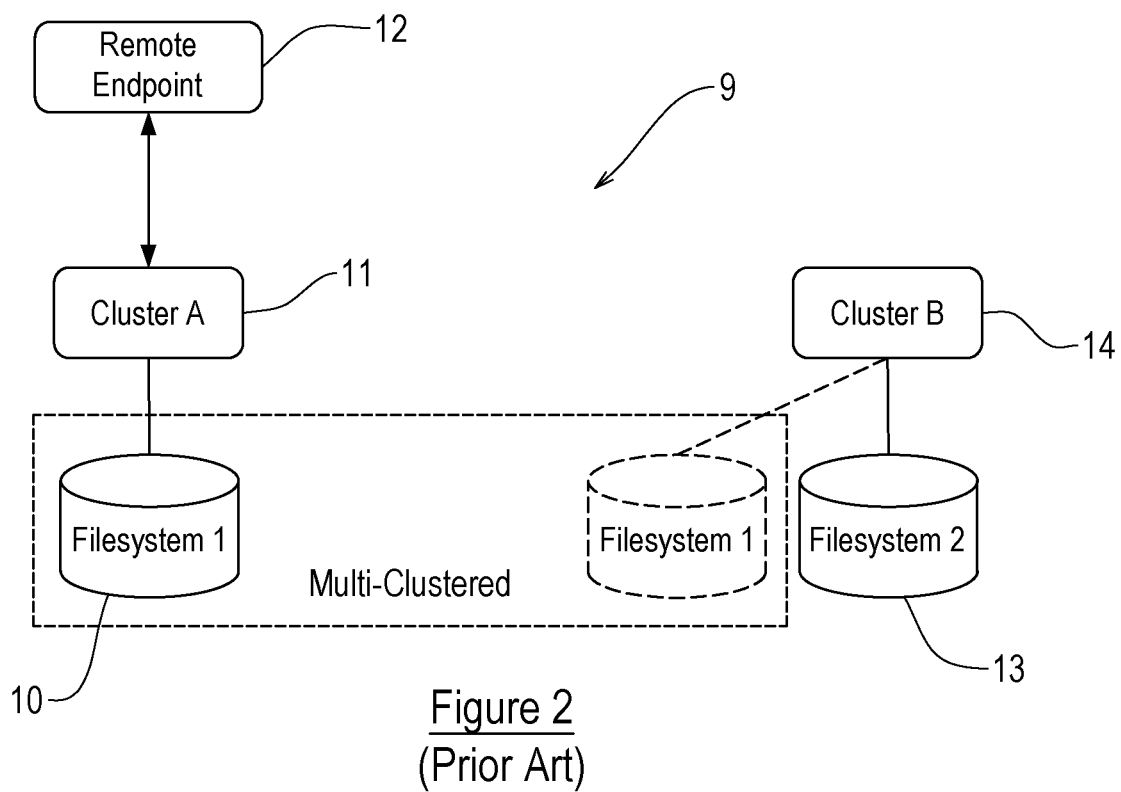
FIG. 2 is a schematic diagram of another conventional data storage system.

Access to a migrated file on the local first filesystem 49 results in the generation of a LWE event and the successful recall of the file. Access to a migrated file on the first filesystem 49 from the second cluster 48 which is remote from the first filesystem 49 also results in the generation of a LWE event and the successful recall of a file from the first filesystem 49. FIG. 10 illustrates the contrast in a data storage system of some embodiments from the conventional data storage system shown in FIG. 2 where it is not possible to access a migrated file on a remote filesystem.

In the embodiments described above at least some and preferably all operations in a data management system are carried out using light weight events. The light weight events therefore at least partly replace the DMAPI operations in a conventional data management system. The light weight events allow granular operation of the data management system so that each light weight event can be processed in an optimal manner on a corresponding storage target with the status result and data from the operation being passed to the filesystem as each operation is performed. The LWE module of some embodiments enables the lightweight events to be processed in parallel with one another such that files are immediately made available out-of-order to the requesting process on an immediate basis as soon as processing of the file or data blocks is finalised. This provides a significant performance enhancement over DMAPI order-based queue implementations as recalled data is immediately available in the shortest timespan.

The optimizations to the data storage system provide a many order magnitude of performance increase over a conventional data management system that relies on DMAPI. The performance improvement of the system is such that the system of some embodiments can feasibly be used to transfer data between data storage targets and/or a filesystem within the same local computing network. The system of some embodiments can therefore be used to transfer data between storage targets and/or a filesystem located remotely from one another or within the same local computing network without placing a high performance requirement on the servers and hardware within the computing network. The system of some embodiments therefore provides significant flexibility over a conventional system which relies on DMAPI operations to transfer data since these conventional system require a high performance overhead which is impractical for transferring data within a local computing network.

The system of some embodiments enables the filesystem to continue operating even when the LWE module is not functioning. Unlike a conventional system which relies on a DMAPI system being operational, the system of some embodiments does not suffer from the single point of failure whereby failure in a DMAPI system prevents the system operating. This removes the need for a user to maintain multiple redundant DMAPI servers which reduces the cost and the maintenance requirement for the user. A further benefit of a data storage system of some embodiments is that the LWE functionality is not reliant on the presence of a database. The performance of the system is therefore not hindered by the need to update a database with the state of a file or operation. Furthermore, the data storage system of some embodiments does not suffer from the additional requirements that would be necessary if a database were present, such as the need to back up and protect the database and to minimise corruption to the database. The removal of the reliance on a database therefore improves the reliability of the data storage system over conventional data storage systems that are reliant on a database to maintain the state of a file or an operation.

Embodiments of the subject matter and the functional operations described herein can be implemented in digital electronic circuitry, or in computer software, firmware, or hardware, including the structures disclosed in this specification and their structural equivalents, or in combinations of one or more of them.

Some embodiments are implemented using one or more modules of computer program instructions encoded on a computer-readable medium for execution by, or to control the operation of, a data processing apparatus. The computer-readable medium can be a manufactured product, such as hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The terms "computing device" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks.

To provide for interaction with a user, some embodiments are implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A data management system coupled to a filesystem and at least one data storage target, the system comprising:
a processor configured to execute instructions;
a memory storing instructions which, when executed by the processor, cause the processor to:
intercept a plurality of operation instructions sent from a user application module to the filesystem;
generate a plurality of light weight events, each light weight event corresponding to a respective operation instruction of the plurality of operation instructions;
store the light weight events for processing in a queue of light weight events;
compare the number of light weight events in the queue of light weight events with a threshold number and, if the number of light weight events is greater than the threshold number, process groups of the light weight events in parallel in respective child subprocesses, wherein each child subprocess processes each light weight event by enacting the operation instruction which corresponds to the light weight event to perform an operation on data stored by the at least one data storage target, or if the number of light weight events is not greater than the threshold number, process each light weight event by enacting the operation instruction which corresponds to the light weight event to perform an operation on data stored by the at least one data storage target; and
provide at least one response notification to the filesystem, the at least one response notification indicating a processing status for one or more of the light weight events such that the data management system can monitor each operation as it is performed on data stored by the at least one data storage target.

2. The system of claim 1, wherein the data management system is a hierarchical storage management system.

3. The system of claim 1, wherein the plurality of operation instructions are selected from a group including read, open for reading, write, open for writing, destroy/delete, close, eviction from memory or flushing a buffer.

4. The system of claim 1, wherein the system is configured to generate each light weight event in response to rule evaluated by a GPFS/Spectrum Scale Placement Policy.

5. The system of claim 1, wherein the system further comprises:

a user input and output controller, and wherein the memory further stores instructions which, when executed by the processor, cause the processor to:
  detect the at least one processing status for one or more of the light weight events, wherein:
    if the at least one processing status indicates that processing of one or more of the light weight events is not complete, at least partly suspending an input and output of the user input and output controller, and
    if the at least one processing status indicates that processing of one or more of the light weight events is complete, enabling the input and output of the user input and output controller.

6. The system of claim 1, wherein the memory further stores instructions which, when executed by the processor, cause the processor to: generate a first tracking record of light weight events that are queued for processing in the queue of light weight events; and generate a second tracking record of light weight events that have been processed.

7. The system of claim 6, wherein the memory further stores instructions which, when executed by the processor, cause the processor to:
  generate first and second tracking records for each data storage target in the storage management system.

8. A method of managing data in a storage management system, wherein the storage management system comprises a filesystem and at least one data storage target, the method comprising:
  intercepting a plurality of operation instructions sent from a user application module to the filesystem;
  generating a plurality of light weight events, each light weight event corresponding to a respective operation instruction of the plurality of operation instructions;
  storing the light weight events for processing in a queue of light weight events;
  comparing the number of light weight events in the queue of light weight events with a threshold number and,
    if the number of light weight events is greater than the threshold number, processing groups of the light weight events in parallel in respective child subprocesses, wherein each child subprocess processes each light weight event by enacting the operation instruction which corresponds to the light weight event to perform an operation on data stored by the at least one data storage target (17), or
    if the number of light weight events is not greater than the threshold number,
  processing each light weight event by enacting the operation instruction which corresponds to the light weight event to perform an operation on data stored by the at least one data storage target; and
  providing at least one response notification to the filesystem, the at least one response notification indicating a processing status for one or more of the light weight events such that the storage management system can monitor each operation as it is performed on data stored by the at least one data storage target.

9. The method of claim 8, wherein the plurality of operation instructions are selected from a group including read, open for reading, write, open for writing, destroy/delete, close, eviction from memory or flushing a buffer.

10. The method of claim 8, wherein the method comprises generating each light weight event in response to rule evaluated by a GPFS/Spectrum Scale Placement Policy.

11. The method of claim 8, wherein the plurality of operation instructions are provided to the filesystem by a user application module, and wherein the method further comprises:
  detecting the at least one processing status for one or more of the light weight events, wherein:
    if the at least one processing status indicates that processing of one or more of the light weight events is not complete, at least partly suspending an input and output of the user application module, and
    if the at least one processing status indicates that processing of one or more of the light weight events is complete, enabling the input and output of the user application module.

12. The method of claim 8, wherein the method further comprises:
  storing the light weight events for processing in a queue of light weight events.

13. The method of claim 12, wherein the method further comprises:
  generating a first tracking record of light weight events that are queued for processing in the queue of light weight events; and
  generating a second tracking record of light weight events that have been processed.

14. The method of claim 13, wherein the method comprises generating first and second tracking record for each data storage target in the storage management system.

15. A non-transitory computer readable medium storing instructions which, when executed by a processor of a data management system coupled to a filesystem and at least one data storage target, cause the data management system to:
  intercept a plurality of operation instructions sent from a user application module to the filesystem;
  generate a plurality of light weight events, each light weight event corresponding to a respective operation instruction of the plurality of operation instructions;
  store the light weight events for processing in a queue of light weight events;
  compare the number of light weight events in the queue of light weight events with a threshold number and,
    if the number of light weight events is greater than the threshold number, process groups of the light weight events in parallel in respective child subprocesses, wherein each child subprocess processes each light weight event by enacting the operation instruction which corresponds to the light weight event to perform an operation on data stored by the at least one data storage target, or
    if the number of light weight events is not greater than the threshold number,
  process each light weight event by enacting the operation instruction which corresponds to the light weight event to perform an operation on data stored by the at least one data storage target; and
  provide at least one response notification to the filesystem, the at least one response notification indicating a processing status for one or more of the light weight events such that the data management system can monitor each operation as it is performed on data stored by the at least one data storage target.

* * * * *